Feb. 13, 1962 G. N. WILLIS 3,020,625

SOCKET FEEDING METHOD AND APPARATUS

Filed July 5, 1955 6 Sheets-Sheet 1

INVENTOR
GRANT N. WILLIS

BY Lindsey and Prutzman
ATTORNEYS

Feb. 13, 1962 G. N. WILLIS 3,020,625

SOCKET FEEDING METHOD AND APPARATUS

Filed July 5, 1955

6 Sheets-Sheet 2

INVENTOR

GRANT N. WILLIS

BY Lindsey and Prutzman

ATTORNEYS

INVENTOR
GRANT N. WILLIS

BY Lindsey and Prutzman
ATTORNEYS

Feb. 13, 1962 G. N. WILLIS 3,020,625

SOCKET FEEDING METHOD AND APPARATUS

Filed July 5, 1955 6 Sheets-Sheet 4

INVENTOR
GRANT N. WILLIS

BY Lindsey and Prutzman
ATTORNEYS

Feb. 13, 1962 G. N. WILLIS 3,020,625

SOCKET FEEDING METHOD AND APPARATUS

Filed July 5, 1955 6 Sheets-Sheet 5

INVENTOR
GRANT N. WILLIS

BY Lindsey and Prutzman
ATTORNEYS

Feb. 13, 1962 G. N. WILLIS 3,020,625

SOCKET FEEDING METHOD AND APPARATUS

Filed July 5, 1955 6 Sheets-Sheet 6

INVENTOR
GRANT N. WILLIS

BY Lindsey and Prutzman
ATTORNEYS 3,020,625
SOCKET FEEDING METHOD AND APPARATUS

Grant N. Willis, Bristol, Conn., assignor to United-Carr Fastener Corporation, Boston, Mass., a corporation of Delaware Filed July 5, 1955, Ser. No. 519,958
3 Claims. (Cl. 29—155.5)

This invention relates to a method and apparatus for automatically feeding and attaching articles to panels and has particular application in the securing of electron tube sockets in panels used in electrical equipment, such as printed circuit panels, chassis members and the like.

In the manufacture of electrical and electronic equipment with automatic fabrication and assembly techniques, one difficulty experienced has been that of automatically feeding and attaching small parts of irregular shape to panels such as printed circuit panels. The small size and irregular shape of such articles makes them difficult to handle even with special equipment such as hoppers, chutes, escapements and the like, yet for efficiency they must be fed entirely automatically at high rates, and must be attached with uniform security. Moreover, many such parts, as for example tube sockets, will have different rotated positions and each must be attached with a particular orientation in order to cooperate properly with the panel or other member to which it is secured. Accordingly, one object of the present invention is to provide a method and apparatus for feeding and attaching articles, such as electron tube sockets, to panels, such as printed circuit panels, which eliminates the need for special sorting and orienting equipment yet provides completely automatic feeding and attachment at a high rate, in a uniformly secure manner and in properly oriented relation.

Another object is to provide a method and apparatus for attaching articles to panels which facilitates prepackaging of the articles to be attached inexpensively and in large numbers, for subsequent feeding into an attaching machine without further handling.

Another object is to provide a method and apparatus for feeding and attaching articles of the character described which can accommodate a wide range of types and sizes of articles to be attached.

Another object is the provision of an improved method of assembling tube sockets to be attached to panels which enables convenient pre-assembly of the sockets in large numbers, which facilitates continuous, rapid jam-proof feeding into an attaching machine, which insures that the sockets will be securely maintained in properly oriented relation during feeding, and which provides a protective cover for the sockets preventing injury or entrance of dirt or foreign matter therein both during and after attachment.

Another object is to provide receptacle feeding and attaching apparatus which is capable of continuous operation at a high rate without need to shut down even during replenishment of the supply of receptacles thereto, and hence is particularly suited for production operation.

Another object is to provide receptacle feeding and attaching apparatus which is capable of attaching a sequence of receptacles to a panel or other member with the receptacles of the sequence having different selected angles of orientation, and which apparatus may be readily adjusted to accommodate any desired number of receptacles in such a sequence.

Other objects will be in part obvious, and in part pointed out more in detail hereinafter.

The invention accordingly consists in the features of construction, combination, of elements and arrangement of parts which will be exemplified in the construction hereafter set forth and the scope of the application of which will be indicated in the appended claims.

Figure 7:
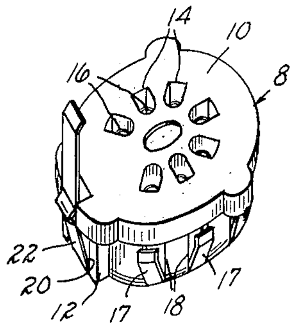
FIG. 7 is an enlarged perspective view of an exemplary socket of a type with which the present invention is concerned.
Figure 8:
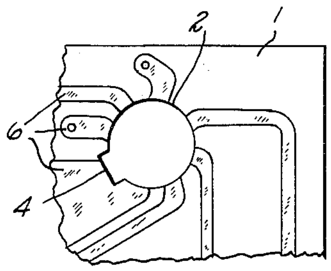
FIG. 8 is a fragmentary view of an exemplary electrical panel to which the socket of FIG. 7 is adapted to be attached.

Referring to the drawings, the invention is illustrated in connection with the feeding and attaching of electron tube sockets to printed circuit panels for electronic equipment. FIG. 7 shows an electron tube socket of a type to which the present invention may be applied, and FIG. 8 shows an exemplary printed circuit panel to which the socket of FIG. 7 is adapted to be attached. The panel 1 shown in FIG. 8 is provided with openings 2 dimensioned to accommodate sockets with a snug fit. The openings 2 have keyways which, in a single panel, may be disposed at different angular positions. Printed conductors 6 on the panel extend to the edges of the openings 2 and are adapted to be electrically connected through conductors in the socket to the pins of a tube carried thereby. The socket illustrated has a general cylindrical plastic body 8 formed with a somewhat rounded lower end which is adapted to be inserted in an opening 2 in a panel. The top surface 10 of the socket is flat and has a circumferential flange which is adapted to seat against the surface of the panel. A radially projecting key 12 on the socket cooperates with a keyway 4 in a panel opening 2 to determine the angular orientation of the socket in the panel. The socket has a plurality of cavities 14 in its top surface, each cavity being fitted with a metal lug 16 adapted to receive and make electrical contact with a pin of a tube inserted into the socket. Depending tails 17 on the lugs 16 project from the bottom of the socket and, in the socket illustrated, are reversely bent into the slots 18 in the side of the body 8 to facilitate making electrical contact with conductors 6 when the socket is inserted into the panel. A slot 20 in the socket key 12 accommodates a ground strap 22 on the socket by which selected lugs 16 as well as the envelope or shield of a tube inserted in the socket may be grounded if desired.

Figure 9:
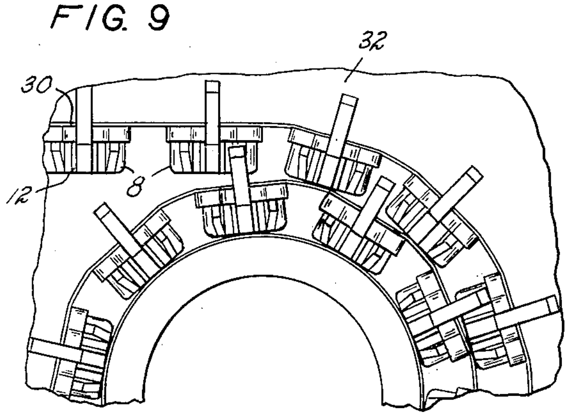
FIG. 9 is a fragmentary view of a reel of sockets preassembled in accordance with the invention for feeding and attachment to a panel.

In accordance with the invention, it has been discovered that feeding and handling of the sockets is greatly simplified by assembling them in magazines each consisting of a continuous tape 30 to which a plurality of sockets are secured in a row in uniformly spaced and oriented relation, and which tape is then coiled up to form a self-supporting spool or reel 32, as shown in FIG. 9. According to the invention the tape may be made of any inexpensive material of sufficient strength to permit feeding without breakage. One such material, for example, is paper. The sockets are placed on a single layer of the tape 30 with their flat top surfaces 10 in contact therewith, and in the preferred embodiment of the invention are secured to the tape by means of an adhesive. Conveniently the adhesive may be provided in the form of a coating of adhesive material on one side of the tape itself.

The sockets all face in the same direction on the tape and each is oriented so that its ground strap 22 projects over the edge of the tape and thereby avoids interference with the tape.

With this arrangement each socket is securely retained by the tape and protected both top and bottom by a layer of tape. Thus sockets packed in this way may be conveniently shipped or stored without injury or loss, and may be easily handled in large quantities without special equipment. Moreover, the tape serves as a feed belt by which the sockets may be conveyed to an attaching machine for insertion into a panel, as well as a means of maintaining the sockets in properly oriented relation during feeding. Also with this arrangement large numbers of sockets may be conveniently pre-assembled into magazine form for subsequent feeding into an attaching machine as needed without further handling. Since the tape is secured to the top surfaces of the sockets, it covers the tube pin cavities 14 in each socket and thereby prevents the entrance of dirt or other foreign matter into these cavities during handling or storage. Also, the tape may be left on the sockets after their insertion in the panel to provide a protective cover preventing solder or the like from entering the tube pin cavities during solder dipping or other processing of the panel.

Figure 1:
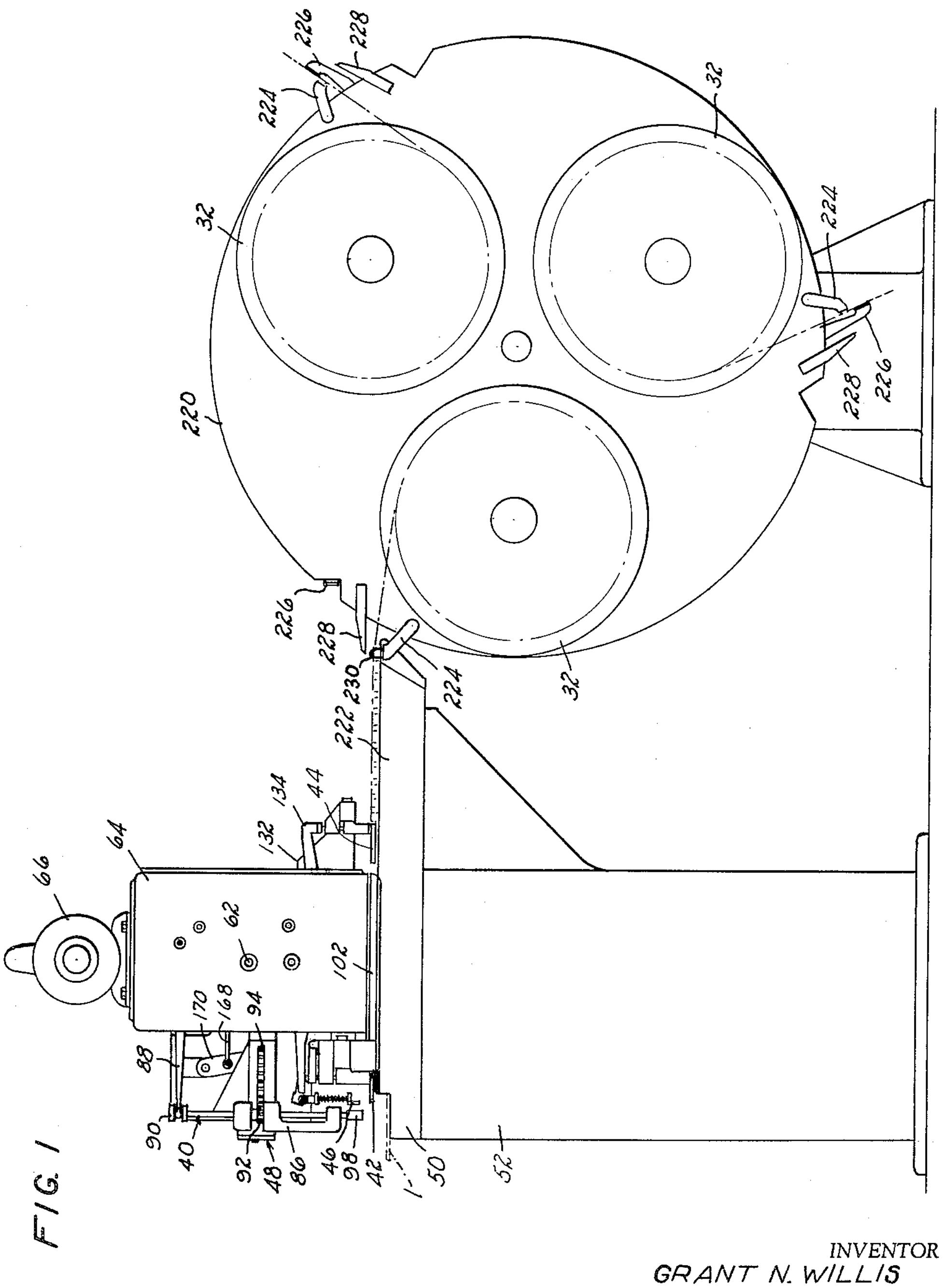
FIG. 1 is a side elevation view of a tube socket attaching machine constructed in accordance with the invention.

Turning now to FIGURES 1 to 6 of the drawings, there is shown a socket feeding and attaching machine constructed in accordance with the invention for securing the tape-mounted sockets to panels. The machine includes four main operating elements, namely a spindle which serves as a driving member for inserting individual sockets into a panel, front and rear feed jaws which feed the tape-mounted sockets to the spindle, a cutter for periodically severing the tape between individual sockets, and a programming mechanism for controlling the angular orientation of sockets inserted into a panel. As shown in FIG. 1, a bed 50 beneath the spindle provides a convenient surface for supporting a panel to be loaded with sockets, and the machine may be bench mounted or mounted on an individual stand 51 as shown to bring the bed to a convenient working height.

Figure 4:
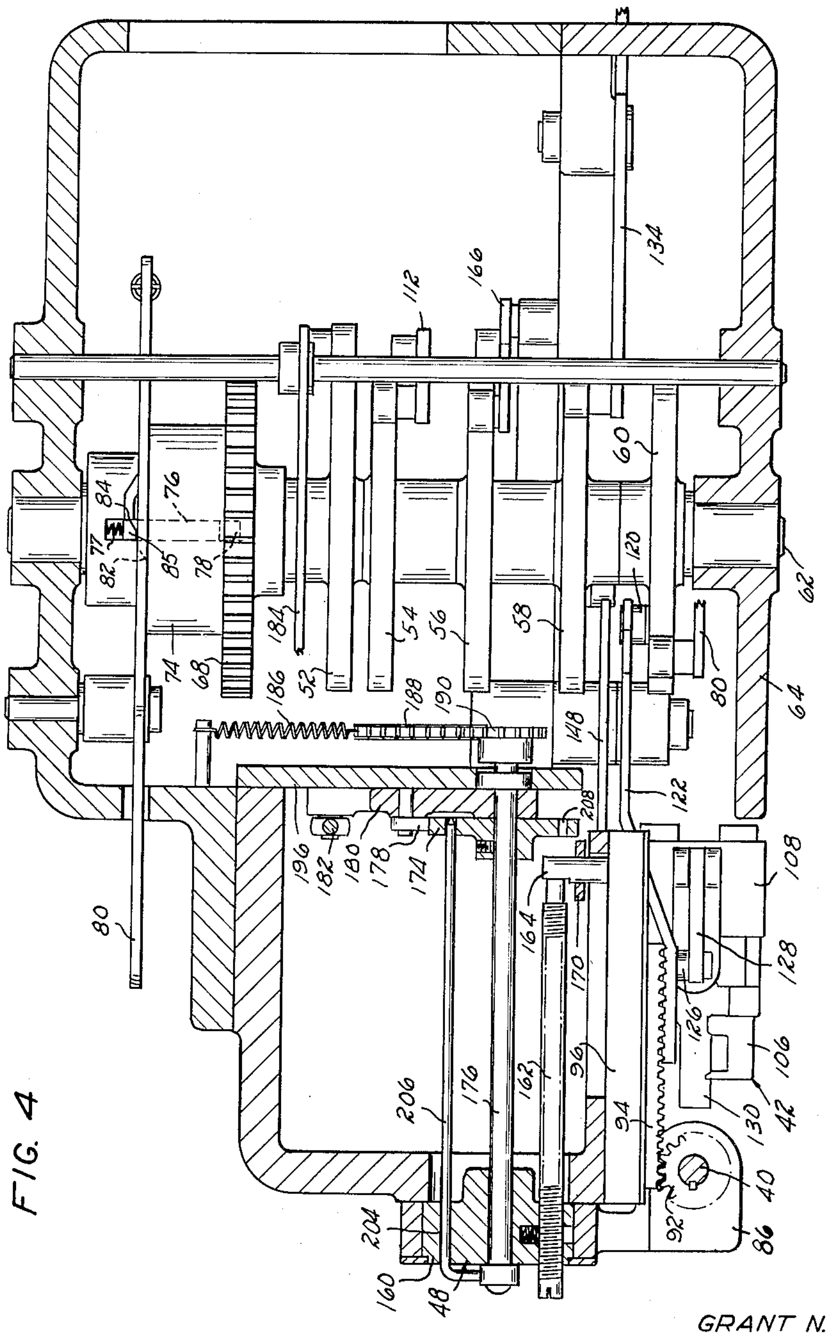
FIG. 4 is a sectional view of the structure shown in FIG. 2 taken approximately on the line 4—4 thereof.
Figure 6:
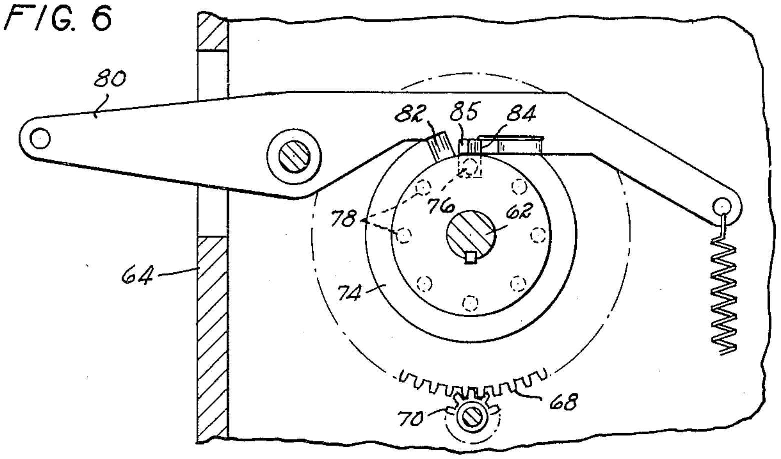
FIG. 6 is an enlarged fragmentary view of another portion of the driving means of the machine.

Operation of the several elements of the machine is coordinated by means of a set of disc cams 52, 54, 56, 58, 60 mounted on a cam shaft 62 journaled in the machine frame 64, as best shown in FIG. 4. The cams are driven by a motor 66, through a conventional single revolution clutch, as best shown in FIGURES 4 and 6. The clutch includes a gear 68 freely rotatable on the cam shaft and in mesh with a continuously rotating pinion 70 connected through a belt 72 to the drive motor 66. Adjacent gear 68 is a hub 74 fixed to shaft 62 and carrying a slidable drive pin 76 backed by a spring 77 and arranged to mate with one of a series of bores 78 in gear 68. Operation of the clutch is controlled by a pivotally mounted operating lever 80 having a release cam 82 and a stop 84 arranged to cooperate with an enlarged upstanding head 85 on pin 76. With this arrangement, when the left-hand end of operating lever 80 is depressed, as shown in FIG. 6, the drive pin 76 is driven by spring 77 into one of the bores 78 in continuously rotating gear 68, causing cam shaft 62 to rotate one complete revolution, whereupon the cam 82 engages head 85 of drive pin 76 and withdraws the pin from gear 68, and the pin 76 abuts stop 84 to prevent further rotation of cam shaft 62. Thus, each time operating lever 80 is depressed the cam shaft turns one full revolution, during which the cams are arranged to manipulate the various operating elements of the machine through one complete socket-inserting cycle.

Figure 2:
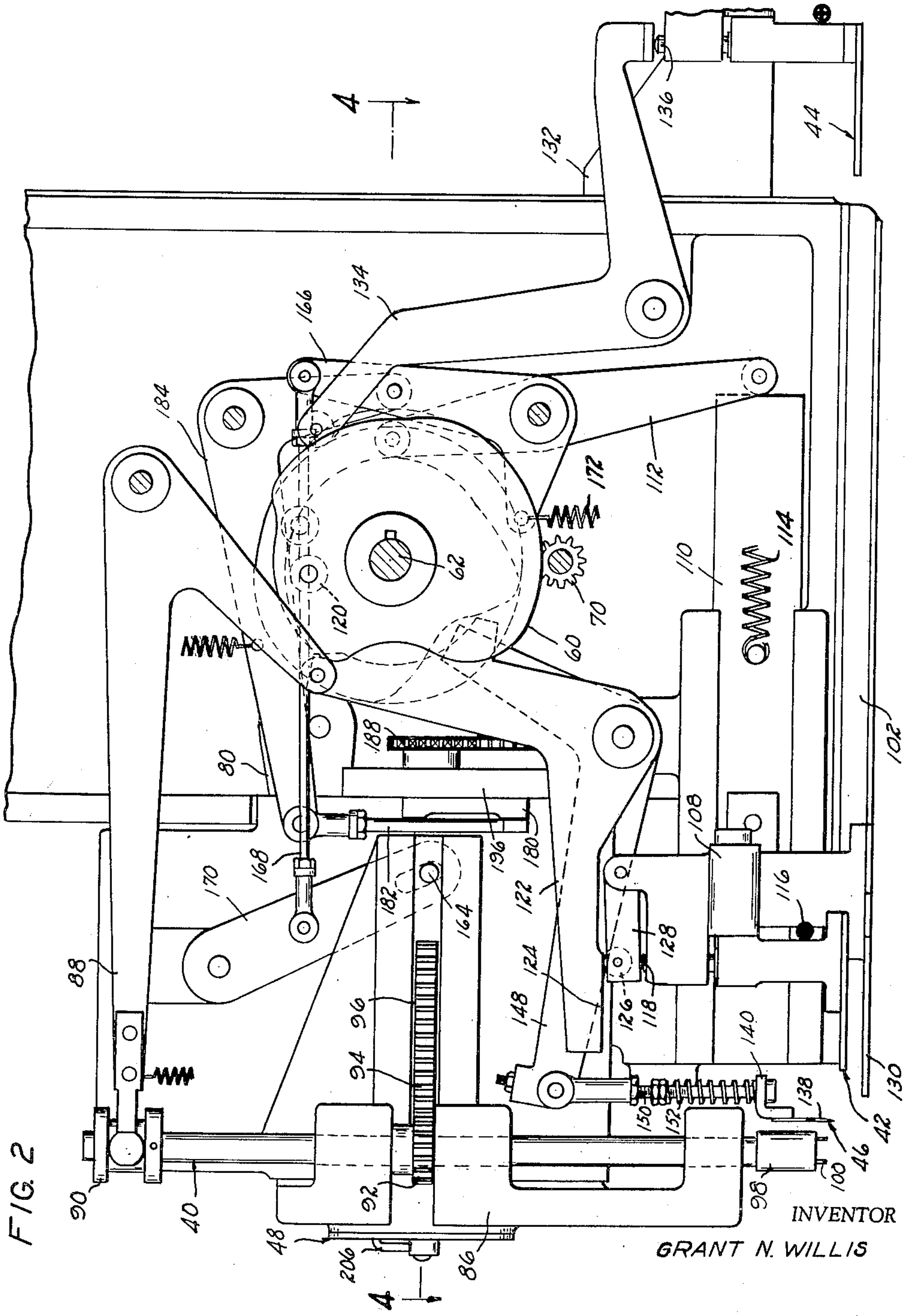
FIG. 2 is a fragmentary side elevation view to an enlarged scale of a portion of the machine shown in FIG. 1, with its side plate removed to show the internal arrangement of parts.
Figure 3:
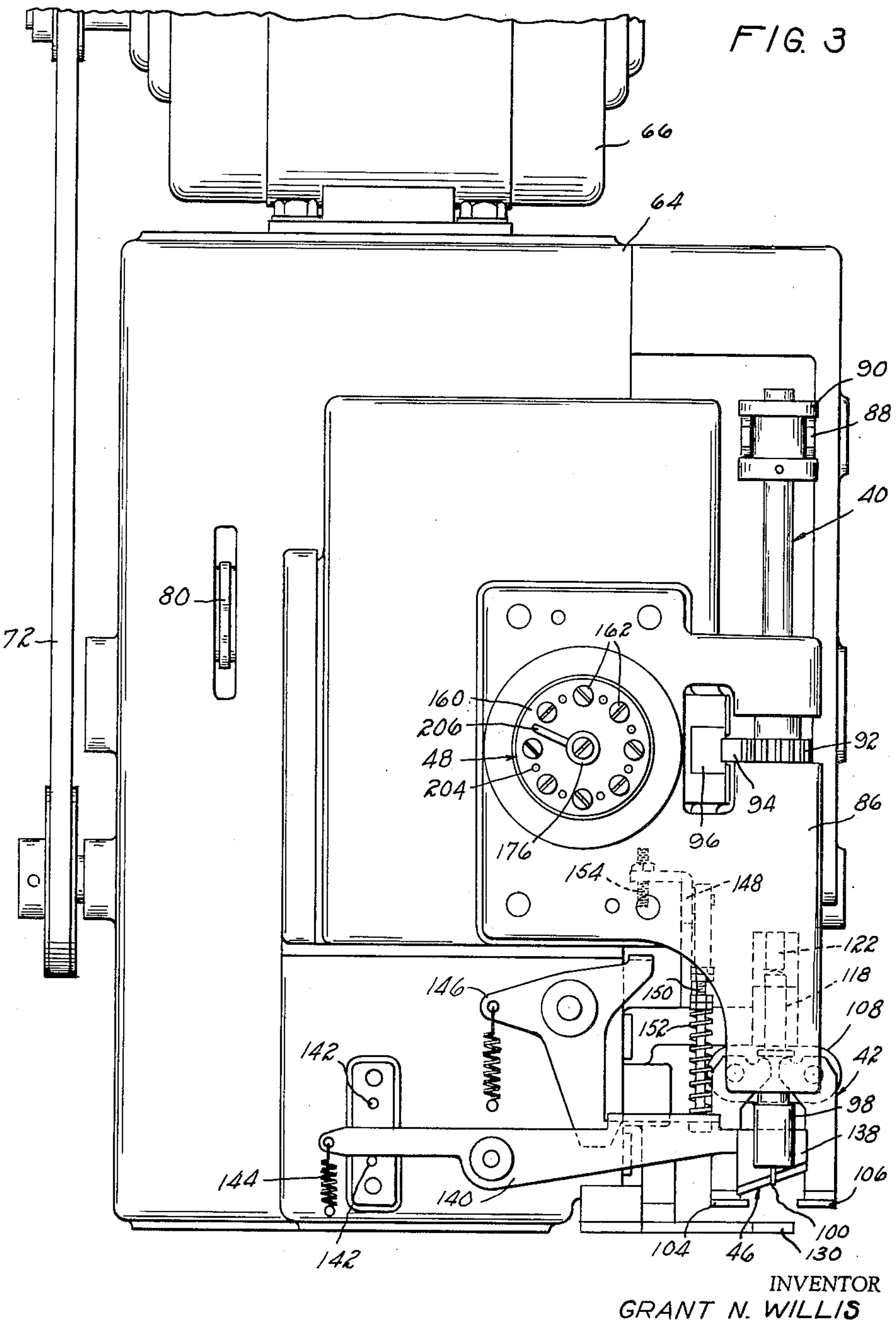
FIG. 3 is a fragmentary front elevation view to an enlarged scale of a portion of the machine shown in FIG. 1.

Turning now to the details of the operating elements of the machine, as best shown in FIG. 2, the spindle 40 is mounted for vertical reciprocation and rotation in a bracket 86 fixed to the frame of the machine. Rotation of the spindle is effected by a pinion 92 in mesh with a rack 94 carried by a reciprocable slide 96 on the frame, while vertical movement of the spindle is controlled by cam 60 on cam shaft 62 through a lever 88 which engages a collar 90 fixed to the upper end of the spindle. On the lower end of the spindle is fixed a headpiece 98 having a pair of downwardly projecting prongs 100 dimensioned to enter a pair of the tube pin cavities 14 in each socket and engage the lugs 16 therein with sufficient friction to retain the socket on the prongs. The cam 60 is shaped to move the spindle between four axial positions, namely its uppermost or retracted position in which the prongs 100 are elevated above the path of sockets fed beneath the spindle, a slightly lower "load" position in which the prongs 100 may extend into a socket, a still lower "home" position, and its lowermost position in which the spindle inserts a socket carried by the prongs 100 into an aligned opening in a panel on the bed 50. The tape-mounted sockets are fed to spindle 40 along a supporting shelf or track 102 on the frame. The sockets are fed along track 102 in right side up relation, i.e., with their top surfaces 10 facing up and covered by tape 30, by front feed jaws 42 and rear jaws 44 at opposite ends of the track. The front jaws include a pair of opposed jaw blades 104, 106, pivotally mounted on a bracket 108 carried by a slide 110 reciprocable on the frame parallel to the track. The blades 104, 106 are of sufficient length to engage several sockets at a time, thereby minimizing the strain on the adhesive bond of the tape during indexing of the sockets. Forward displacement of the front jaws is controlled by cam 54 through a lever 112 engaged with the slide, the length of the stroke being such as to index one socket at a time beneath the spindle. The jaws are returned rearwardly by a spring 114 connected between slide 110 and a point on the frame. The jaw blades 104, 106 are biased to a closed position by a spring 116 and are arranged to open in response to depression of a plunger 118, as best shown in FIG. 3, under the control of a roller 120 on cam 60 and a lever 122. The lever 122 has a downwardly facing surface 124 which actuates plunger 118 through a roller 126 and crank 128 on bracket 108, the length of surface 124 being such that the lever remains in engagement with the roller 126 during the full forward displacement of the front jaws so that the jaws can be opened or closed at any point in their reciprocatory movement. Beneath the front jaw blades is a plate 130 carried by bracket 108 which forms a forward extension of shelf 102 on which sockets positioned between the jaw blades may rest. The plate reciprocates with the jaws 42 and thus provides a traveling support for the leading socket, supporting it beneath spindle 40 when the jaws are displaced to their forwardmost position.

The rear jaws 44 are similar to the front jaws except that they are mounted on a fixed bracket 132 secured to the frame and do not reciprocate. Opening and closing of the rear jaws is controlled by cam 58 through a lever 134 and plunger 136.

To separate the leading socket from the remainder of the tape after it has been fed beneath the spindle, the machine includes the cutter 46 which, as shown in FIGURE 2, is disposed above the path of the sockets between spindle 40 and front jaws 42 in a position such as to sever tape 30 just back of a socket beneath the spindle. The cutter includes a blade 138 mounted on the end of an arm 140 pivotally mounted on the frame, as best shown in FIGURE 3. Vertical movement of the cutter is limited by engagement of the arm 140 with adjustable stops 142 on the frame and the cutter is biased to its uppermost position by a spring 144 connected between the frame and the end of the arm opposite the cutter. The cutter is retained in its uppermost position by a spring-biased latch 146 pivotally mounted on the frame. Operation of the cutter is controlled by a roller carried by cam 58 through a pivotal lever 148. The lever 148 is connected to arm 140 by a rod 150 and compression spring 152 providing a lost motion connection of the flying shear type, and an adjustable pin 154 on the lever is arranged to engage a shoulder on latch 146 when lever 148 is pivoted, as best shown in FIG. 3. With this arrangement, when lever 148 is pivoted, the knife arm 140 is at first held stationary by the latch and spring 152 is compressed. When lever 148 has pivoted sufficiently to load spring 152 substantially, pin 154 releases latch 146 and the cutter snaps downward severing the tape cleanly and without stripping it from the sockets on either side of the cut.

Figure 10:
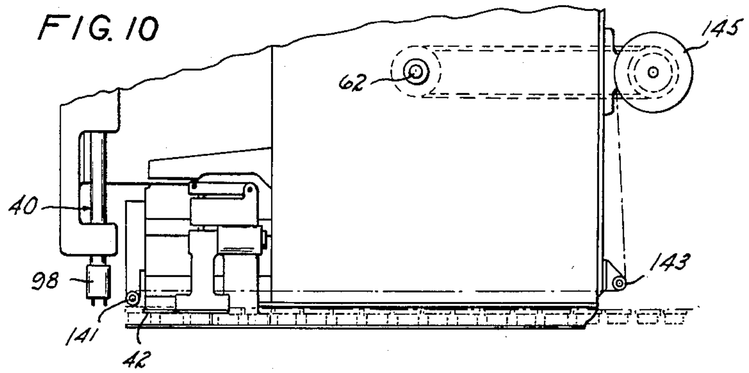
FIG. 10 is a fragmentary side elevation view to an enlarged scale of the machine of FIG. 1, showing an alternative form of certain details thereof.

In the event that it is desired to remove the tape completely from the sockets at the time of insertion, the machine may be arranged alternatively as shown in FIG. 10. As there shown, the cutter 46 is replaced by a roller 141 mounted on the frame and disposed above the path of the sockets between the front jaws and spindle 40. The tape is led up and over roller 141, back to an idler roller 143 at the rear of the frame, and thence to a wind-up roll 145 driven from cam shaft 62. With this arrangement when the front jaws advance, the wind-up roll rotates slightly to maintain tape tension and the tape is stripped cleanly off the leading socket.

To facilitate automatic insertion of sockets in a panel of the type having a number of socket-receiving openings 2 whose keyways 4 are arranged at different angles, the machine is provided with a programming mechanism for rotatively positioning spindle 40 at different selected angles during insertion of successive sockets of a sequence. This arrangement thus makes it unnecessary to rotate a panel on bed 50 in order to insert successive sockets at different angles, the only movement of the panel required being a rectilinear movement such as to position the various panel openings beneath spindle 40 in proper sequence.

In accordance with the invention the programming mechanism includes a turret 160 rotatably mounted on the frame and carrying a plurality of elongate stop pins 162 arranged to be successively indexed into the path of a stud 164 on rack slide 96 during successive socket-insertion cycles. The slide is periodically driven by cam 56, lever 166, and adjustable tie rod 168 and crank 170 to a rearward position such that the spindle is rotated to an angular position aligning prongs 100 with a pair of lugs 16 in the leading socket, and a spring 172 returns the slide to a forward position determined by the engagement of stud 164 with whichever stop pin 162 is in alignment therewith. Thus the angular position of the spindle when the slide returns to its forward position will be determined by the stop pin aligned with stud 164. Each stop pin 162 is threaded for independent longitudinal adjustment and thus the several stop pins provide precise control of the angular orientation of the spindle and prongs 100 during successive socket insertion cycles.

Figure 5:
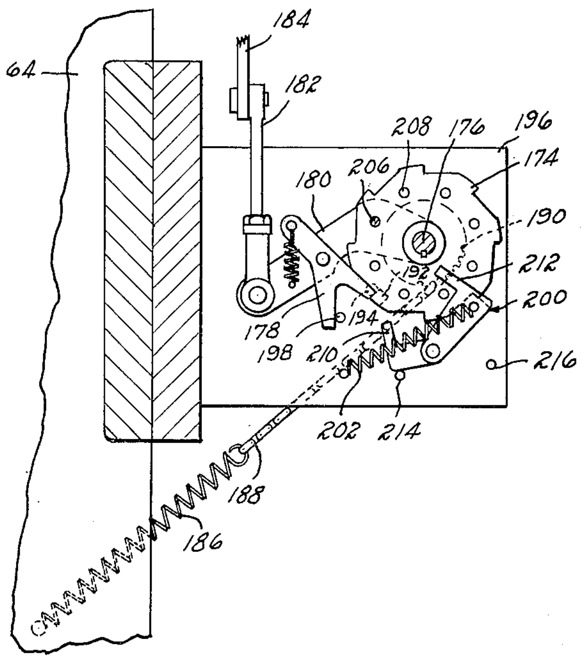
FIG. 5 is an enlarged fragmentary view of a portion of the programming means of the machine.

Provision is made to index turret 160 automatically in coordination with reciprocation of the spindle so that during the insertion of successive sockets of a sequence the spindle will be rotated automatically to the various angular positions desired. To this end the turret is rotated in coordination with the reciprocation of rack slide 96 by a ratchet drive including a ratchet wheel 174 fixed on a shaft 176 keyed to the turret and a drive pawl 178 carried by an indexing lever 180 actuated through a push rod 182 and lever 184 from cam 52. A spring 186 and chain 188 drivingly connected to ratchet wheel 174 through a gear 190 bias the ratchet wheel clockwise as shown in FIG. 5 to an initial position in which a stop 192 on the wheel engages a pin 194 on a plate 196 secured to the frame. With this arrangement, when push rod 182 is depressed, drive pawl 178 indexes ratchet wheel 174 forward, i.e., counterclockwise, as shown in FIG. 5. During each forward movement of the ratchet wheel, the drive pawl is cammed counterclockwise out of engagement with the ratchet wheel by a pin 198 on plate 196, but reverse movement of the ratchet wheel is prevented by a stop pawl 200 pivotally mounted on the plate and biased into engagement with the ratchet wheel by a spring 202.

Further in accordance with the invention, the turret is arranged to be automatically reset to its starting position after a number of socket-insertion cycles corresponding to the number of sockets in a sequence to be inserted in a particular panel. To this end provision is made to reset ratchet wheel 174 after it has advanced a number of steps corresponding to the number of sockets to be inserted in each panel. For this purpose the turret is provided with a plurality of angularly spaced bores 204 in which may be selectively inserted a reset rod 206 of sufficient length to extend to a corresponding one of a plurality of angularly spaced holes 208 in ratchet wheel 174. Cooperating with reset rod 206 is a latch of the escapement type having a pair of fingers 210, 212 and arranged to pivot with stop pawl 200 between an operating position determined by a stop 214 such that the finger 212 is disposed in the path of rotation of reset rod 206, and an outer position determined by a stop 216 such that the finger 212 is removed from the path of the reset rod. Finger 210 is disposed on the back side of ratchet wheel 174 (see FIG. 5) and, because reset rod 206 does not project through wheel 174, finger 210 is not engaged by rod 206.

With this arrangement, when ratchet wheel 174 is advanced a sufficient number of steps as determined by the hole 208 in which the reset rod is positioned, the reset rod cams the finger 212 outward and spring 202 toggles the latch and stop pawl clockwise against stop 216. Thus the next time ratchet wheel 174 is advanced and pin 198 disengages the drive pawl 178, the ratchet wheel is reset to its initial position by spring 186. Resetting movement of ratchet wheel 174 causes stop 192 to cam finger 210 outward and toggles stop pawl 200 back into operating position. Resetting of ratchet wheel 174, of course, resets turret 160 and thus repositions the stop pins 162 in readiness for control of another series of socket-insertion cycles. Thus the turret may be arranged to reset automatically after a desired number of sockets have been inserted merely by selectively positioning the reset rod. It will therefore be apparent that the programming mechanism is extremely versatile and enables the machine to be readily set up for use with panels having any number of socket openings.

Summarizing the operation of the machine as thus far described, the machine is loaded by threading a socket-carrying tape 30 through the rear jaws 44, along the track 102 and through the front jaws 42. Describing a complete socket-insertion cycle as controlled by the single revolution clutch, at the beginning of the cycle the spindle is in its "home" position and the front and rear jaws are closed. When the clutch is engaged by depressing lever 80, the spindle depresses to socket-inserting position momentarily and then returns to its uppermost or rest position, and the rear jaws open. The closed front jaws move forward to index the leading socket together with supporting plate 130 beneath the spindle, the tape being stripped off in the arrangement shown in FIG. 10, and the slide 96 is driven to its rearwardmost position rotating the spindle to its reference angular position such that the prongs 100 are aligned with a pair of the lugs 16 in the leading socket. The rear jaws then close, the spindle is depressed to its load position at which prongs 100 enter the leading socket and engage lugs 16, and when stripping of the tape off the sockets is not desired cutter 46 severs the tape between the leading socket and the socket next adjacent thereto. Then the front jaws open and are returned together with plate 130 to their rearwardmost position. The spindle is then depressed to its "home" position and slide 96 is returned by spring 172 to its forwardmost position as determined by the engagement of stud 164 with a stop pin 162, thereby rotating spindle 40 to a selected angular position such that the key of the socket it is carrying is aligned with the keyway 4 of the panel opening 2 below preparatory to further depression of the spindle to its socket-inserting position at the beginning of the next cycle. The cycle is completed by closing of front jaws 42 preparatory to indexing the sockets forward another step during the next insertion cycle. At the beginning of the next cycle the spindle again depresses to socket inserting position, and the socket carried by prongs 100 is thrust into a panel opening, where it is securely retained as the spindle returns to its rest position.

To facilitate continuous operation of the machine and avoid the necessity for a shutdown each time a socket magazine is used up, provision is made to automatically thread a fresh magazine into the machine when the end of the previous magazine is reached. For this purpose there is provided a rotatable supply wheel or drum 220 on which a plurality of reels or magazines of sockets are rotatably mounted in concentric angularly spaced relation, as shown in FIG. 1. The wheel 220 is disposed opposite the rearward end of track 102 the space therebetween being bridged by a projecting arm 222 which forms a rearward extension of the track and across which the sockets are adapted to be fed to the rear jaws 44. At each magazine position on the wheel is a holder 224 into which the leading edge of the tape is adapted to be threaded when a magazine is mounted at that position. A spring biased presser 226 and a knife 228 is also provided at each magazine position. The wheel is arranged to be indexed so as to bring successive magazine positions into registry with the rearward end of the arm 222. Indexing of the wheel may be controlled automatically by any suitable means, such as, for example, a photocell 230 arranged to monitor the path of sockets at the rearward end of arm 222 and activate a wheel indexing motor (not shown) when a gap in the train of sockets occurs.

With this arrangement, when the wheel 220 is indexed to bring a particular magazine position into registry with the arm 222, first the knife at the preceding magazine position severs any extraneous tape of the preceding magazine just behind the last socket thereof, the holder 224 adjacent the fresh magazine is brought to a position of alignment with the rearward end of arm 222, as shown in FIG. 1, adjacent the last socket in the preceding magazine, and the presser 226 presses the initial portion of the tape of the fresh magazine onto the tape covering the last socket of the preceding magazine. Thus the leading end of the fresh magazine tape is joined with the tail of the preceding magazine tape in proper relation to insure uniform spacing of sockets and continuous uninterrupted feeding of the sockets into the machine. While the machine is being fed from one magazine, empty stations on the wheel may be reloaded as convenient, and thus continuous operation of the machine is insured avoiding costly and inefficient stoppages.

The socket feeding and inserting arrangement described has many advantages. Mounting of the sockets on tape facilitates handling and protects them from injury, and provides an inexpensive self-contained feed belt facilitating machine operation at high rates and insuring accurate orientation of each socket while eliminating the need for expensive special equipment such as hoppers, escapements and the like. Tape mounting also enables the sockets to be prepacked in convenient quantities, and covers the tube pin cavities preventing entrance of dirt or other foreign matter during storage and handling, and preventing entrance of solder or other material during subsequent processing of the panels. The feeding and inserting machine is fully automatic and capable of operating continuously at a rapid rate. Moreover, in view of the extreme versatility afforded by the programming mechanism, the machine is adaptable to insertion of sockets with absolute precision in panels having various numbers of openings with keyways arranged at various angles, and may be readily converted from one type of panel to another.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims in intended to cover all of the generic and specific features of the invention herein described and all statements of the scope of the invention which, as a matter of language, might be said to fall therebetween.

I claim:

1. The method of orienting selectably positionable components on a supporting structure which comprises adhesively securing a plurality of the components on a continuous strip in predetermined uniformly spaced apart locations and in predetermined uniformly oriented disposition relative to one another locating a supporting structure having apertures of a configuration and size complemental to components to be assembled thereon in a predetermined position, moving the continuous strip along an established guide path to a predetermined location where one of said components is to be disassociated from said continuous strip at a location relative to one of the apertures of said supporting structure to facilitate assembly of said removed component on said supporting structure, disassociating said component from said continuous strip, angularly orienting said component relative to an aperture having its complemental configuration and size, and providing relative movement between said disassociated component and said supporting structure sufficient to assemble said component in its allocated aperture on said structure.

2. The method of orienting selectably positionable components and assemblying the same on a supporting structure which comprises adhesively securing a plurality of the components on a continuous strip in predetermined uniformly spaced apart locations and in predetermined uniformly oriented disposition relative to one another locating a supporting structure having apertures of a configuration and size complemental to components to be assembled thereon in a predetermined position, moving the continuous strip along an established guide path to a position where one of said components is to be disassociated from said continuous strip at a location relative to one of the apertures of said supporting structure to facilitate assembly of said disassociated component on said supporting structure, disassociating the component at one end of the continuous strip from the remainder thereof, urging said disassociated component into alignment with an allocated portion of said supporting structure, angularly orienting said component relative to an aperture having its complemental configuration and size, and providing relative movement between said removed component and said supporting structure sufficient to assemble said component in its allocated aperture on said structure.

3. The method of mounting slectably positionable electrical components having terminals thereon on a supporting structure having electrical circuitry preformed thereon and adapted to be in contact with said terminals, which comprises adhesively securing a plurality of the electrical components on a continuous strip in predetermined uniformly spaced apart locations and in a predetermined uniformly oriented disposition relative to one another locating a supporting structure having apertures defined in part by end edges of said electrical circuitry and being of a configuration and size complemental to said electrical components to be mounted thereon in a predetermined position, moving the continuous strip along an established guide path to a position where one of said components is to be disassociated from said continuous strip at an allocated aperture of said supporting structure to facilitate assembly of said disassociated component on said supporting structure, disassociating the end component from said continuous strip, gripping said disassociated component, angularly orienting said component relative to the aperture having its complemental configuration and size, and providing relative movement between said disassociated component and said supporting structure sufficient to mount said component on said structure with said circuitry and said terminals in proper electrical correlation.

References Cited in the file of this patent

UNITED STATES PATENTS

| | | |
|---|---|---|
| 1,325,325 | Janke | Dec. 16, 1919 |
| 1,744,026 | Baltzley | Jan. 21, 1930 |
| 1,982,880 | Pachter | Dec. 4, 1934 |
| 2,019,973 | Homel | Nov. 5, 1935 |
| 2,170,147 | Lane | Aug. 22, 1939 |
| 2,208,873 | Rosenberg | July 23, 1940 |
| 2,251,326 | Cullin | Aug. 5, 1941 |
| 2,281,478 | Chirelstein | Apr. 28, 1942 |
| 2,394,837 | Bartelheim | Feb. 12, 1946 |
| 2,408,330 | Miller | Sept. 24, 1946 |
| 2,534,867 | Hennessey | Dec. 19, 1950 |
| 2,547,644 | Hogue | Apr. 3, 1951 |
| 2,563,468 | Hroch | Aug. 7, 1951 |
| 2,595,188 | Del Camp | Apr. 29, 1952 |
| 2,637,098 | Stein | May 5, 1953 |
| 2,638,661 | Klinliek | May 19, 1953 |
| 2,710,441 | Heyman | June 14, 1955 |
| 2,727,299 | Klumpp | Dec. 20, 1955 |
| 2,768,429 | Willis | Oct. 30, 1956 |
| 2,802,995 | Mautone | Aug. 13, 1957 |